June 6, 1939.  G. V. RYLSKY  2,161,531
RELIEF VALVE
Filed Dec. 28, 1936
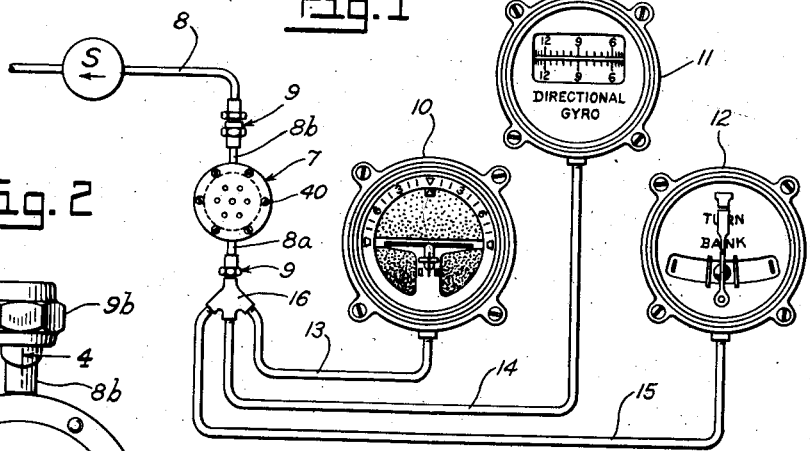
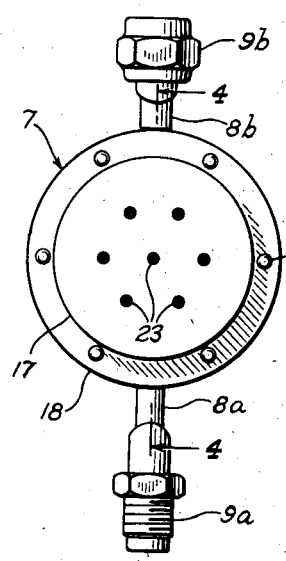
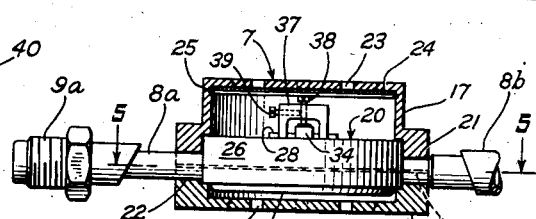
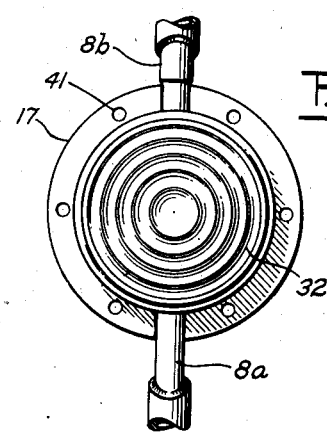
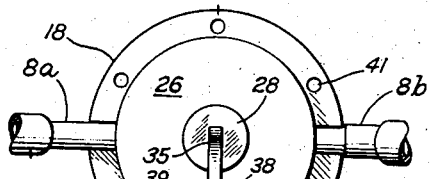
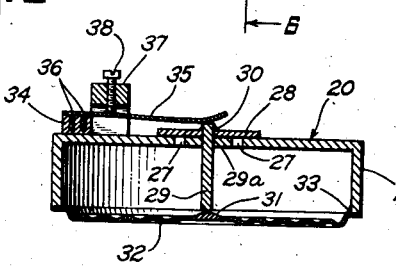
INVENTOR.
Gregory V. Rylsky
BY Stephen Cerstvik
ATTORNEY.

Patented June 6, 1939

2,161,531

UNITED STATES PATENT OFFICE 2,161,531

RELIEF VALVE

Gregory V. Rylsky, New York, N. Y., assignor to Bendix Aviation Corporation, South Bend, Ind., a corporation of Delaware Application December 28, 1936, Serial No. 117,984

7 Claims. (Cl. 137—153)

The present invention relates to pressure regulating devices for supplying fluid at constant pressure and more particularly to pressure regulating devices adapted to control the air supply from a suitable source to air-operated gyroscopic instruments on aircraft.

At the present time, several air-operated gyroscopic instruments are employed, such for instance, as a gyroscopic turn indicator, directional gyroscope and a gyro pendulum which provides an artificial horizon. In order that such instruments may be capable of efficient operation, it is desirable that the speed of rotation of the gyro rotors thereof be maintained constant. Air pressure for driving the gyro rotors is generally supplied either from the air craft engine by operating a pressure or suction pump or by using the suction produced by the intake manifold of the engine or by a Venturi tube projecting from the wing of the aircraft. In all of these instances, however, the air pressure varies with the speed of the engine or of the craft and consequently the speed of rotation of the gyro rotors of the instrument varies accordingly.

In the present invention, it is proposed to interpose between the pressure supply and the indicator, a novel regulating valve for maintaining the pressure substantially constant. In this specification the term pressure is used in the broad sense to include either super-atmospheric or sub-atmospheric pressure, the latter being generally designated as a suction and being most usually employed at the present time. It is, therefore, one of the objects of the present invention to provide a novel pressure regulating means for supplying air at a constant pressure to gyroscopic instruments on an aircraft whereby the gyro rotors of said instruments are maintained at a constant speed.

Another object of the invention is to provide a novel differential valve including a pressure actuated diaphragm which shall be extremely simple in design, easy to manufacture, and of few parts so as to be particularly easy to assemble.

Another object is to provide in a pressure regulating system for aircraft instruments a novel differential valve adapted to be placed between the pump and the instruments, comprising a rigid cylinder closed at one end, with a disc covered opening therein, a flexible diaphragm sealing the rigid cylinder at the other end, one side of said diaphragm being exposed to pump pressure and the other side to the atmosphere, whereby said disc is moved from said opening.

Still another object is to provide in a novel pressure regulating mechanism including a perforated casing enclosing a diaphragm and a valve mechanism, one side of said perforated casing leading to said diaphragm and the other side of said perforated casing leading to the valve.

The above and other objects and advantages of the invention will appear more fully hereinafter from a consideration of the detailed description which follows, taken together with the accompanying drawing wherein is illustrated one embodiment of the invention. It is to be expressly understood, however, that the drawing is for the purposes of illustration only and is not designed as a definition of the limits of the invention, reference being had for this purpose to the appended claims.

In the drawing wherein like reference characters refer to like parts throughout the several views:

Fig. 1 is a digrammatic showing of the regulator valve including the air pump and several gyroscopic instruments;

Fig. 2 is a plan view of the entire device;

Fig. 3 is a bottom view of the device with the bottom half of the casing removed;

Fig. 4 is a section taken generally on line 4—4 of Fig. 2 showing the diaphragm device in elevation;

Fig. 5 is a view taken along lines 5—5 of Fig. 4 with the top half of the casing removed; and Fig. 6 is a section taken along line 6—6 of Fig. 5.

Referring to the drawing and more particularly to Fig. 1, S indicates, generally, a source of pressure such as a vacuum pump, intake manifold or Venturi tube, said source being connected to the pressure regulating valve 7 inserted in the pipe line 8 by pipe couplings 9 and leading to the gyro instruments such as the artificial horizon 10, directional gyro 11 and turn indicator 12, by means of pipes 13, 14 and 15, respectively, feeding from four-way fitting 16.

Referring to Fig. 4, the pressure regulating valve 7 comprises, as shown, a casing made of two parts 17, 18 with a gasket 19 between the peripheries thereof. Inside of said casing is the valve mechanism 20 which has connected thereto conduits 8a and 8b extending through co-acting semi-circular opening 21, 22 in the top and bottom parts 17 and 18 of said casing, respectively, and provided with parts 9a, 9b of the pipe couplings 9.

Part 17 of the casing is provided with openings or perforations 23 leading to the interior thereof and covered on the inside by screen 24 held in place by resilient ring 25. Part 18 is provided with openings 23a.

The valve mechanism 20, as best shown in Fig. 6, comprises a rigid cylindrical shell 26 forming a closure at one end with small openings 27 therein forming bleeder ports normally closed by disc 28. Said disc may be polished on one side to cooperate with the polished surface of the area surrounding openings 27. Disc 28 is mounted on one end of rod 29 by soldering or brazing as indicated at 30 or made integral therewith. Rod 29 passes through the bearing 29a and the other end of said rod abuts the flexible diaphragm 32 which is soldered, brazed or welded to cylinder 26 at 33 to seal the other end of said cylinder. Brazed to the top of cylinder 26, near one end of a diameter thereof, is a block 34 on which is mounted regulatable resilient means comprising a spring 35 fastened at one end thereof to said block by means of screws 36. The other end of the spring 35 bears upon the top of rod 29 to hold disc 28 against the bleeder openings 27. Also, brazed to the top cylinder 26 is the inverted U-shaped block 37 containing adjusting screw 38 and lock screw 39 therefor (see Fig. 5). Leading to the interior of element 26 is conduit 8a terminating at the other end in part 9a of the coupling 9 while leading from the interior is conduit 8b terminating at its end in part 9b of the coupling.

In assembling the device valve mechanism 20 is inserted in casing part 18, gasket 19 is then inserted on the periphery thereof and the casing part 17 mounted on part 18, the two parts being fastened together by screws 40 (see Fig. 1) inserted in openings 41 in casing parts 17 and 18. The assembled device is then inserted in place by means of coupling parts 9a, 9b.

The operation of the device is as follows: A vacuum produced by pump means S produces a suction in the instruments through the pressure regulating valve 7 and pipes 13, 14 and 15. The suction enters the interior of the cylindrical element 26 through conduit 8b. Suction, therefore, is on one side of diaphragm 32 while air pressure entering through openings 23a is exerted on the opposite side of the diaphragm. When the suction on the inside of cylindrical element 26 exceeds that desired, whereby the instruments 10, 11 and 12 would be speeded up, the atmospheric pressure exerted upon diaphragm 32 pushes the rod 29 upwardly to move the surface contacting disc 28 to uncover the bleeder ports 27 and thereby allow air to enter from perforations 23 to reduce the vacuum. The spring pressure of element 35, the disc 28, the size and location of hole 27 and the diaphragm are so chosen that equilibrium will be obtained at the value of vacuum desired so as to maintain said vacuum.

There is, therefore, provided a device for maintaining constant the pressure of the fluid supplied for operating gyro instruments on aircraft, which device is both simple in operation and construction, which is sturdy and, due to the small number of parts, is easy to assemble and will not easily get out of order.

Although only one embodiment of the invention has been illustrated and described other changes and modifications in form, materials and relative arrangement of parts, which will now appear apparent to those skilled in the art, may be made without departing from the scope of the invention. Reference is, therefore, to be had to the appended claims for a definition of the limits of the invention.

What is claimed is:

1. In a pressure regulating device adapted to be inserted between a source of pressure and aircraft instruments, a cylindrical shell closed at one end, an opening in said end, a disc closing said opening, an imperforate flexible diaphragm brazed to said shell and comprising the sole means for sealing the other end of said shell, said disc being arranged for actuation by said diaphragm, resilient means urging said disc in one direction, and conduit means for said shell providing an inlet and an outlet to said shell for the pressure to be regulated, said conduit means carrying at their ends, coupling means, whereby said device may be readily inserted in place.

2. In a pressure regulating system for aircraft instruments, a differential valve adapted to be placed between the pump and the instruments comprising a rigid cylinder, a plane surface closing the cylinder at one end with an opening therein, a disc one plane surface of which coacts with said first plane surface to close said opening, an imperforate flexible diaphragm comprising the sole means for sealing the rigid cylinder at the other end, one side of said diaphragm being exposed to the pump pressure and the other side to the atmosphere, and means whereby said disc is moved from said opening upon actuation of said diaphragm.

3. In a pressure regulator, a rigid container closed at one end and sealed at the other by a diaphragm, an opening in said closed end, a disc covering said opening and means whereby said diaphragm may actuate said disc, conduit means connected to said container and provided with conduit connecting means at the ends thereof, a perforated casing comprising two parts surrounding said container and fitting over said conduit means, the perforations in the upper part of said casing leading to said disc and the perforations in the bottom half thereof leading to said diaphragm, screening means covering the perforations in said upper half and held in place by resilient means, and resilient means opposing the movement of said disc.

4. In a pressure regulator, a rigid bowl having an open end, an imperforate diaphragm comprising the sole means for sealing the open end of said bowl, a flat surface on said bowl, an opening in said surface, surface contacting means comprising a flat member closing said opening, means between said surface contacting means and said diaphragm for actuation thereby and aligned conduit means forming an inlet and an outlet for said bowl.

5. In a pressure regulator, a rigid container having an open end, a portion of said container presenting an outer plane area, an opening in said area, an imperforate diaphragm comprising the sole means for sealing said open end, means presenting a polished surface contact to said plane area and closing said opening, means for moving said first means upon movement of said diaphragm, and adjustable resilient means mounted on said outer plane area retarding the movement of said first means.

6. In a pressure regulator, a container having an open end, an opening in said container, imperforate diaphragm means disposed opposite said opening and comprising the sole means for sealing said open end, valve means closing said opening, a casing having a plurality of perforations and surrounding said container, part of said perforations leading to said valve means and part leading to said diaphragm.

7. In a pressure regulating device, a rigid cup-shaped body having a plane surface, an imperforate flexible diaphragm brazed to the edge of said cup and thereby sealing the same, an inlet to said cup, and an outlet therefrom, an opening in said plane surface, a disc abutting said plane surface on the outside of said cup to close said opening, spring means mounted on said surface and abutting said disc, means on said surface for adjusting the tension of said spring and means connecting said diaphragm to said disc to control the closing of said opening.

GREGORY V. RYLSKY.